2,897,101

PRINTING AND DYEING COMPOSITIONS AND PROCESS OF TREATING TEXTILES

Wilhelm Graulich, Leverkusen-Bayerwerk, Andreas Schmitz and Wilhelm Berlenbach, Koln-Stammheim, and Erwin Muller, Leverkusen, Germany, assignors to Farbenfabriken Bayer Aktiengesellschaft, Leverkusen, Germany, a corporation of Germany No Drawing. Application January 4, 1957
Serial No. 632,407

Claims priority, application Germany January 7, 1956

22 Claims. (Cl. 117—139.5)

This invention relates to and has as its objects the printing, padding, dyeing and impregnating of textiles. The invention further relates to printing and dyeing compositions.

A number of methods for the finishing, dyeing and printnig of fabrics have recently been described using copolymers as binding agents. Finishes of particularly good fastness to washing and to rubbing are obtained by these methods when applied in combination with agents which promote cross-linking of the polymer film on the fibre. Other processes of printing and dyeing textiles use as film-forming agents water-soluble salts of substances containing amino or imino groups. These salts are converted into insoluble substances in the course of printing, inter alia by the addition of polyfunctional vinyl compounds. Prints on staple fibre of particularly good fastness properties are obtained by combining suitable copolymer emulsions with water-soluble basic self-cross-linking polymers, especially when the copolymer emulsions employed carry in the polymer chain reactive groups capable of reacting with the basic polymers.

In accordance with the present invention it has been found that the printnig, padding and dyeing of fabrics by means of pigments and the impregnating can be carried out in a particularly simple manner by using for the impregnation or as binding agents aqueous emulsions of self-cross-linking copolymers from about 0.5 to 25%, preferably 1 to 12%, of monomers containing at least one of the grouping

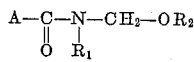

wherein A stands for a $CH_2=CH—$, a

or a $ROOCCH=CH—$ group, the radical R being a radical of an aliphatic alcohol, $R_1$ stands for hydrogen, an alkyl, aralkyl or aryl group, and $R_2$ means an alkyl group, and 75 to 99.5% of compounds which contain at least one polymerizable double bond. Such monomers are for example the alkyl ethers, preferably the methyl and ethyl ether, of methylol compounds of acrylic acid amide or methacrylic acid amide or of monoesters of maleic acid amide.

In this process the additional use of cross-linking agents is not necessary so that e.g. the printing pastes and padding liquors have an appreciably prolonged stability. Dyeings and prints are thus obtained which have an exceptionally good fastness to washing and to abrasion and an outstanding brilliancy. Moreover, very good fastness properties are obtained not only on cotton and staple fibre, but also on polyamide and polyurethane fibres, acetate rayon and polyacrylonitrile fibres.

It is further possible to add any desired thickener such as an alginate, tragacanth, polyacrylamide, or the ammonium salt of polyacrylic acid. Pigment printing is preferably carried out with the simultaneous use of a benzine emulsion thickener as an oil-in-water emulsion. With the aid of suitable emulsifiers and benzine, however, the copolymer emulsion may be employed as a water-in-oil emulsion. The use of additional high molecular weight substances which may also be capable of reacting with the alkylmethylol ether groups and thus of giving rise to an additional cross-linking, is not excluded if a special effect may thereby be obtained. This relates in particular to formaldehyde resins based on urea, melamine and the like known as textile finishing agents, and also to low molecular weight condensation products of formaldehyde with these compounds, for example the methylol compounds or methyl-methylol ethers having more than one methylol group such as the tetramethylolether of hydrazodicarboxylic acid amide, or polyacrylamide. These compounds may advantageously be combined with the copolymer emulsions used according to the invention, since their cross-linking reactions proceed according to the same scheme as for example the condensation of the formaldehyde resins. Polymeric epoxide resins and other polyfunctional compounds are also suitable.

The possibilities of technical application are therefore extremely versatile, and the self-cross-linking copolymer emulsions according to the invention are suitable for the finishing of textiles, fibre substrata and the like on account of the good adhesiveness to the fibre, of the film thus obtained. The impregnation as well as the printing may be effected with or without the addition of pigments and dyes.

The copolymer emulsions to be used according to the invention may be prepared by polymerizing methylol-alkyl-ethers of polymerizable organic compounds which contain in the molecule at least one grouping of the formula:

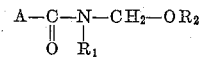

wherein A means a $CH_2=CH—$, a

or a $ROOCCH=CH—$, the radical R being a radical of an aliphatic alcohol, $R_1$ stands for a hydrogen atom, an alkyl, aralkyl or aryl group and $R_2$ means an alkyl group, with one or more organic compounds which contain at least one polymerizable double bond, in an aqueous emulsion, to form high molecular weight compounds containing methylolether groups. These polymers may be cross-linked by alcoholysis, particularly in the presence of small amounts of acid and/or with the application of higher temperatures as well as by reaction with the aforesaid methylol ethers or their cleavage products.

Suitable monomers which may be copolymerized with the monomers of the aforesaid formula are for example the following compounds:

Diolefins with conjugated double bonds such as butadiene, isoprene, dimethylbutadiene, chloroprene, other monomers having two double bonds such as glycoldiacrylate, acrylic acid allylester, vinyl and vinylidene compounds such as styrene, acrylic and methacrylic acid derivatives, vinyl chloride, vinyl acetate, vinyl butyrate, vinylidene chloride, vinyl ether, maleic and fumaric acid diesters. The substitution products and homologues of the aforesaid compounds are also suitable.

The monomers are chosen from these groups according to the desired properties of the prints. Thus, prints may be obtained having an especially pleasant handle by using a high proportion of butadiene or of the acrylic acid esters or of the vinyl ethers of high molecular weight alcohols. If a finishing or padded dyeing with stiffening of the fabric is desired, it is advantageous to use a copolymer with a high proportion of acrylonitrile. Said copolymers having a high proportion of acrylonitrile are further distinguished by good resistance to drycleaning. In the polymer the proportion of the monomers with reactive groups, corresponding to the aforesaid formula, determines the degree of cross-linking ability. Since too high a cross-linking leads in general to brittleness of the film thus formed, the amount of said monomers in the polymer will have to be comparatively small, i.e. about 0.5 to 25 percent, preferably 1 to 12 percent, of the starting monomers. The proportion of the other monomers containing at least one polymerizable double bond amounts to about 75 to 99.5 percent. Suitable copolymer emulsions are, for example, prepared from the monomers in the following proportions:

40 percent of butadiene, 30 percent of acrylic acid butyl ester, 26 percent of styrene, 4 percent of the methyl methylol ether of methacrylic acid amide;

30 percent of butadiene, 30 percent of acrylonitrile, 20 percent of acrylic acid butyl ester, 10 percent of styrene, 4 percent of methacrylamide methylol ethyl ether;

2 percent of acrylamide, 30 percent of acrylonitrile, 66 percent of acrylic acid butyl ester, 2 percent of methacrylamide methylol methyl ether;

30 percent of acrylonitrile, 10 percent of vinyl methyl ether, 56 percent of acrylic acid butyl ester, 4 percent of methacrylamide methylol ethyl ether;

38 percent of styrene, 54 percent of acrylic acid butyl ester, 8 percent of methacrylamide methylol methyl ether;

40 percent of acrylic acid dodecyl ester, 10 percent vinyl methyl ether, 10 percent of styrene, 32 percent of acrylonitrile, 8 percent of methacrylamide methylol methyl ether;

60 percent of methacrylic acid hexylester, 36 percent of vinylidene chloride, 4 percent of the methyl methylol ether from mono-dodecyl ester of maleic acid amide.

Besides pigment dyestuffs the usual fillers for weighting the fabric as well as plasticizers and the like may be added to the emulsions. When using copolymers of butadiene or its derivatives it is moreover expedient to add the anti-oxidizing agents known from rubber chemistry. The addition of water-soluble resin-forming condensation products of aldehydes, particularly of formaldehyde, with phenols, urea, dicyandiamide, melamine or phenolsulfamide, to the aforesaid emulsions has proved to be particularly valuable. It is thereby advantageous to use not only the corresponding monomolecular reaction products, but to carry the condensation, if desired, so far that the condensation products still remain water-soluble. By the addition of these products which act on the self-cross-linking thereby intensifying the cross-linking reaction, a stiffening of the handle is achieved. The amounts of these possible added cross-linking agents depend on the desired properties of the treated fabrics.

When working up the copolymer emulsion, care has to be taken to prevent a premature cross-linking and thus a gelatinizing of the emulsion. It is therefore expedient to render the aqueous emulsion neutral or weakly ammoniacal and, if desired, to add a catalyst such as ammonium phosphate or ammonium nitrate which only under the influence of an elevated temperature liberates a sufficient amount of acid so that the condensation rapidly ensues. The upper limit of temperature is determined by the sensitivity of the treated fabric to temperature; the requisite cross-linking can generally be achieved by a condensation of 1 to 10 minutes at temperatures above 125° C.

The following examples are given for the purpose of illustrating the invention without, however, limiting it thereto.

*Example 1*

280 grams of a 40 percent aqueous copolymer dispersion from 50 percent of acrylic acid butylester, 36 percent of styrene, 10 percent of acrylonitrile and 4 percent of methacrylamide methylol ethyl ether are rendered alkaline with approx. 2 grams of triethanolamine and mixed with 100 grams of 10 percent ammonium polyacrylate (approx. 900 cp.)
30 grams of an ethylene-glycol
10 grams of a reaction product from stearyl alcohol and ethylene oxide (1:24)
365 grams of water
15 grams of a 50 percent ammonium nitrate solution and
200 grams of an aqueous carbon black dispersion.

A ductile printing paste is thus obtained which yields on cotton, staple fibre, acetate rayon and polyurethane fibre a deep black print very fast to washing and to rubbing after fixation at above 120° C.

*Example 2*

250 grams of a 40 percent aqueous copolymer dispersion from 44 percent of acrylic acid butylester, 42 percent of styrene, 10 percent of vinyl-isobutylether and 4 percent of methacrylamide methylolpropyl ether are mixed after the addition of 2 grams of triethanolamine with 30 grams of a 10 percent aqueous solution of a still water-soluble condensation product of formaldehyde with urea (approx. 500 cp.)
40 grams of a 10 percent ammonium-polyacrylate solution (800 cp.)
30 grams of ethylene glycol
10 grams of a reaction product from stearyl-alcohol and ethylene oxide (1:24)
50 grams of a 30 percent aqueous dispersion of copper-phthalocyanine and
290 grams of water.

Into this mixture there are emulsified, using a rapid stirrer of about 2000 r.p.m.: 300 grams of a high-boiling benzine (B.P. 160–220° C.).

Blue prints of high brilliancy, soft handle and very good fastness to washing and rubbing are obtained with this printing paste on cotton, staple fibre, acetate rayon, polyamide and polyurethane fibre.

*Example 3*

Into a mixture of 50 grams of chlorobenzene
50 grams of chlorotoluene
20 grams of sorbitol-trioleate and
30 grams of a high-boiling benzine there is emulsified using a rapid stirrer (2000 r.p.m.) a mixture of 240 grams of an aqueous copolymer dispersion according to Example 1
50 grams of a 40 percent aqueous dispersion of a red azo dyestuff
2 grams of triethanolamine
8 grams of sec. ammonium phosphate.

Stirring is continued until the solid substances of the copolymer dispersion have been absorbed by the external water-immiscible phase. This can be recognized by the fact that, after stirring for 3 minutes, the viscosity of the water-in-oil emulsion increases very strongly up to an upper limit.

The product is then mixed with 130 grams of a high-boiling benzine (B.P. 160–220° C.) and, after emulsifying with 420 grams of water, a printing paste is obtained which yield on textiles described in Example 2 red prints of high brilliancy, soft handle and very good fastness to rubbing and washing after fixation at above 125° C.

Example 4

300 grams of an aqueous copolymer dispersion from
- 40 percent of acrylic acid butyl-ester
- 30 percent of styrene
- 20 percent of vinyl-isobutyl-ether
- 6 percent of acrylonitrile
- 4 percent of methacrylamide methylol ethyl ether are mixed with

- 4 grams of triethanolamine
- 15 grams of the reaction product of stearyl alcohol and ethylene oxide (1:24)
- 30 grams of urea
- 20 grams of glycol
- 100 grams of a 4 percent aqueous ammonium-alginate solution
- 16 grams of a 50 percent ammonium nitrate solution
- 150 grams of finely ground bronze powder and
- 165 grams of water.

This mixture is emulsified, using a rapid stirrer with 200 grams of a high-boiling benzine.

Golden prints of high brilliancy and good fastness to rubbing and washing are obtained with this printing paste on cotton, staple fibre and acetate rayon when the printed fabric is stored for a few days after drying at a high temperature of 90–100° C.

Example 5

50 grams of a 40 percent aqueous emulsion of a copolymer from
- 50 grams of acrylic acid butyl-ester
- 25 grams of acrylonitrile
- 20 grams of styrene and
- 5 grams of the methylmethylol ether from monododecylester of maleic acid amide in about twice the amount of water
- 10 grams of a 20 percent aqueous paste of finely divided copper phthalocyanine and
- 3 grams of glycolic acid are added thereto and the mixture is made up with water to 1000 grams.

A cotton fabric is padded with this solution, dried and then heated to a temperature of 100–125° C. for about 5 minutes. A bright blue dyeing is thus obtained of outstanding fastness to rubbing, scrubbing and washing.

Example 6

30 grams of a 40 percent aqueous emulsion of a copolymer from
- 30 grams of butadiene
- 20 grams of acrylic acid butyl ester
- 45 grams of styrene and
- 5 grams of methacrylamide methylmethylol ether are first mixed with

- 30 grams of a 10 percent aqueous polyacrylamide solution
- 6 grams of a 30 percent aqueous paste of 1,5-bis(benzoylamino)-anthraquinone and
- 3.5 grams of ammonium bitartrate are added thereto and the mixture is made up with water to 100 grams.

A fabric of polyamide fibre is padded with this solution, dried and heated to 120–130° C. for a further 3 to 5 minutes. A yellow dyeing is thus obtained having very good fastness to washing and scrubbing.

Example 7

30 grams of the 40 percent copolymer described in Example 1 are made up in about 100 grams of water, 100 grams of a water-soluble preliminary condensation product of urea with formaldehyde (1:2.5), previously dissolved in 200 grams of water, and 10 grams of a 25 percent paste of the insoluble red azo dyestuff obtained from diazotized 1 - amino - 2 - methoxybenzene - 5 - sulfodiethylamide and 1 - (2 - hydroxy - 3 - carboxynaphthalene)-2,4-dimethoxy-5-chloroanilide are added thereto.

A staple fibre fabric is padded with the aforesaid solution, dried and then heated to 140° C. for 3 to 4 minutes. The fabric is thus dyed fast to light and washing and at the same time finished crease-resistant.

We claim:

1. Process of treating textiles which comprises using as a binding agent, an aqueous emulsion of a copolymer by weight from (a) about 0.5 to 25 percent of a monomer corresponding of the formula $$A-\underset{\underset{O}{\|}}{C}-\underset{\underset{R_1}{|}}{N}-CH_2-OR_2$$

wherein A stands for a member selected from the group consisting of $CH_2=CH-$

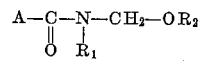

and $ROOCCH=CH-$, the radical R being a radical of an aliphatic alcohol, $R_1$ means a radical selected from the group consisting of hydrogen, alkyl, aralkyl and aryl and $R_2$ stands for an alkyl radical and mixtures of said monomers, and (b) about 75 to 99.5 percent by weight of compounds which contain at least one polymerizable double bond and are free of methylol alkyl ether groups.

2. Process according to claim 1 which comprises using the aqueous copolymer emulsions in combination with polyfunctional compounds capable of reacting with cross-linking with the methylol-ether group of the copolymer.

3. Process according to claim 1 which comprises using the copolymer emulsion in combination with a water-soluble resin formaldehyde product of aldehydes.

4. Process according to claim 1 which comprises using copolymers by weight from (a) about 0.5 to 25 percent of monomers selected from the group consisting of methylolalkyl ethers of acrylamide, methylolalkyl ethers of methacrylamide and methylolalkyl ethers of monoesters of maleic acid amide and mixtures of said monomers, and (b) about 75 to 99.5 percent by weight of monomers selected from the group consisting of butadiene, isoprene, dimethyl-butadiene, chloroprene, glycol-diacrylate, acrylic acid allylesters, styrene, acrylic and methacrylic acid esters, vinyl chloride, vinyl acetate, vinyl butyrate, vinylidene chloride, vinyl ether, maleic and fumaric acid diesters.

5. Process according to claim 1 which comprises using in combination with the aqueous emulsion of a copolymer water-insoluble volatile solvents in the form of an oil-in-water and water-in-oil emulsion.

6. A process according to claim 1 in which the aqueous emulsion of a copolymer is used in combination with a pigment.

7. Process of treating textiles which comprises using as a binding agent, an aqueous emulsion of a copolymer by weight from (a) about 1 to 12 percent of a monomer corresponding to the formula $$A-\underset{\underset{O}{\|}}{C}-\underset{\underset{R_1}{|}}{N}-CH_2-OR_2$$

wherein A stands for a member selected from the group consisting of $CH_2=CH-$

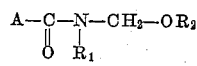

and $ROOCCH=CH-$, the radical R being a radical of an aliphatic alcohol, $R_1$ means a radical selected from the group consisting of hydrogen, alkyl, aralkyl and aryl and $R_2$ stands for an alkyl radical and mixtures of said monomers, and (b) about 88 to 99 percent by weight of compounds which contain at least one polymerizable double bond and are free of methylol alkyl ether groups.

8. Process of treating textiles which comprises using as a binding agent, an aqueous emulsion of a copolymer by weight from (a) about 0.5 to 25 percent of a monomer corresponding to the formula

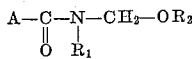

Wherein A stands for a member selected from the group consisting of $CH_2=CH-$

and $ROOCCH=CH-$, the radical R being a radical of an aliphatic alcohol, $R_1$ means a radical selected from the group consisting of hydrogen, alkyl, aralkyl and aryl and $R_2$ stands for an alkyl radical and mixtures of said monomers, and (b) about 75 to 99.5 percent by weight of compounds which contain at least one polymerizable double bond and are free of methylol alkyl ether groups and cross-linking the films and finishes obtained with the emulsions on the textile with the application of elevated temperatures.

9. Process of treating textiles which comprises using as a binding agent, an aqueous emulsion of a copolymer by weight from (a) about 0.5 to 25 percent of a monomer corresponding to the formula

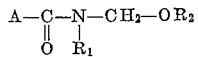

wherein A stands for a member selected from the group consisting of $CH_2=CH-$

and $ROOCCH=CH-$, the radical R being a radical of an aliphatic alcohol, $R_1$ means a radical selected from the group consisting of hydrogen, alkyl, aralkyl and aryl and $R_2$ stands for an alkyl radical and mixtures of said monomers, and (b) about 75 to 99.5 percent by weight of compounds which contain at least one polymerizable double bond and are free of methylol alkyl ether groups and cross-linking the films and finishes obtained with the emulsions on the textile with the application of elevated temperatures and in the presence of a small amount of acid.

10. A printing and dyeing composition which contains as a binding agent a copolymer by weight from (a) about 0.5 to 25 percent of a monomer corresponding to the formula

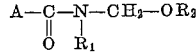

wherein A stands for a member selected from the group consisting of $CH_2=CH-$

and $ROOCCH=CH-$, the radical R being a radical of an aliphatic alcohol, $R_1$ means a radical selected from the group consisting of hydrogen, alkyl, aralkyl and aryl and $R_2$ stands for an alkyl radical, and (b) about 75 to 99.5 percent by weight of compounds which contain at least one polymerizable double bond and are free of methylol alkyl ether groups.

11. A printing and dyeing composition according to claim 10 containing in addition to the aqueous copolymer emulsion a pigment.

12. A printing and dyeing composition according to claim 10 containing in addition to the aqueous copolymer emulsion a polyfunctional compound capable of reacting with cross-linking with the methylol ether group of the copolymer.

13. A printing and dyeing composition according to claim 10 containing in addition to the aqueous copolymer emulsion a water-soluble formaldehyde resin product.

14. A printing and dyeing composition according to claim 10 containing in addition to the aqueous copolymer emulsion a water-insoluble volatile solvent in the form of an oil-in-water emulsion as emulsion thickening.

15. A printing and dyeing composition according to claim 10 containing in addition to the aqueous copolymer emulsion a water-insoluble volatile solvent in the form of a water-in-oil emulsion as emulsion thickening.

16. A composition of claim 10 wherein the binding agent is a copolymer from (a) 4% by weight methacrylamide methylol ethyl ether and (b) 50% by weight acrylic acid butylester, 36% by weight styrene and 10% by weight acrylonitrile.

17. A composition of claim 10 wherein the binding agent is a copolymer from (a) 4% by weight methacrylamide methylolpropyl ether and (b) 44% by weight acrylic acid butylester, 42% by weight styrene and 10% by weight vinyl-iso-butylether.

18. A composition of claim 10 wherein the binding agent is a copolymer from (a) 4% by weight methacrylamide methylol ethyl ether and (b) 40% by weight acrylic acid butyl ester, 30% by weight styrene, 20% by weight of vinyl-isobutyl ether and 6% acrylonitrile.

19. A composition of claim 10 wherein the binding agent is a copolymer from (a) 5% by weight of methylmethylol ether from monododecylester of maleic acid amide in approximately twice the amount of water and (b) 50% by weight acrylic acid butyl-ester, 25% by weight acrylonitrile and 20% by weight styrene.

20. A composition of claim 10 wherein the binding agent is a copolymer from (a) 5% by weight methacrylamide methylmethylol ether and (b) 30% by weight butadiene, 20% by weight acrylic acid butyl ester and 45% by weight styrene.

21. A printing and dyeing composition which contains as a binding agent a copolymer by weight from (a) about 1 to 12 percent of a monomer corresponding to the formula

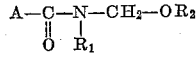

wherein A stands for a member selected from the group consisting of $CH_2=CH-$

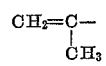

and $ROOCCH=CH-$, the radical R being of an aliphatic alcohol, $R_1$ means a radical selected from the group consisting of hydrogen, alkyl, aralkyl, and aryl, and $R_2$ stands for an alkyl radical and mixtures of said monomers, and (b) about 88 to 99 percent by weight of a compound which contains at least one polymerizable double bond and are free of methylol alkyl ether groups.

22. A printing and dyeing composition which contains as a binding agent a copolymer by weight from (a) about 0.5 to 25 percent of a monomer selected from the group consisting of methylolalkyl ethers of acrylamide, methylolalkyl ethers of methacrylamide and methylolalkyl ethers of monoesters of maleic acid amides and mixtures of said monomers and (b) about 75 to 99.5 percent by weight of a monomer selected from the group consisting of butadiene, isoprene, dimethyl-butadiene, chloroprene, glycol-diacrylate, acrylic acid allylesters, styrene, acrylic and methacrylic acid esters, vinyl chloride, vinyl acetate, vinyl butyrate, vinylidene chloride, vinyl ester, maleic and fumaric acid diesters.

References Cited in the file of this patent

UNITED STATES PATENTS

| | | |
|---|---|---|
| 2,653,140 | Allenby | Sept. 22, 1953 |
| 2,719,831 | Craemer | Oct. 4, 1955 |